March 9, 1965
U. A. PEURON
3,173,114
ELECTRICAL INDUCTIVE APPARATUS
Filed Jan. 17, 1962
2 Sheets-Sheet 1
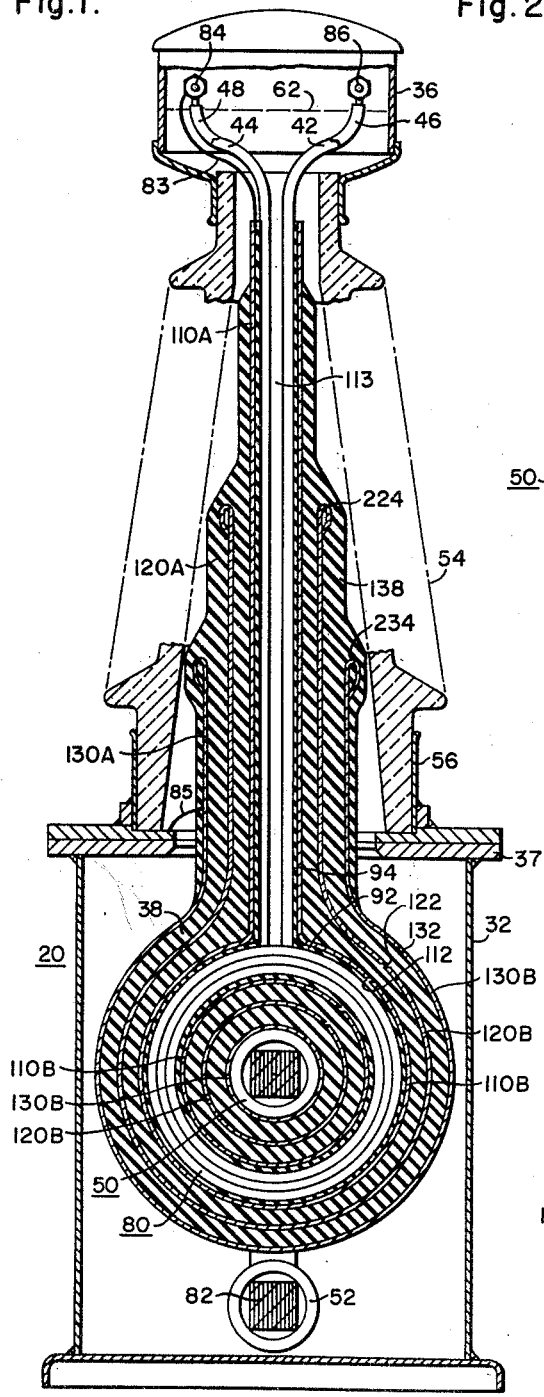
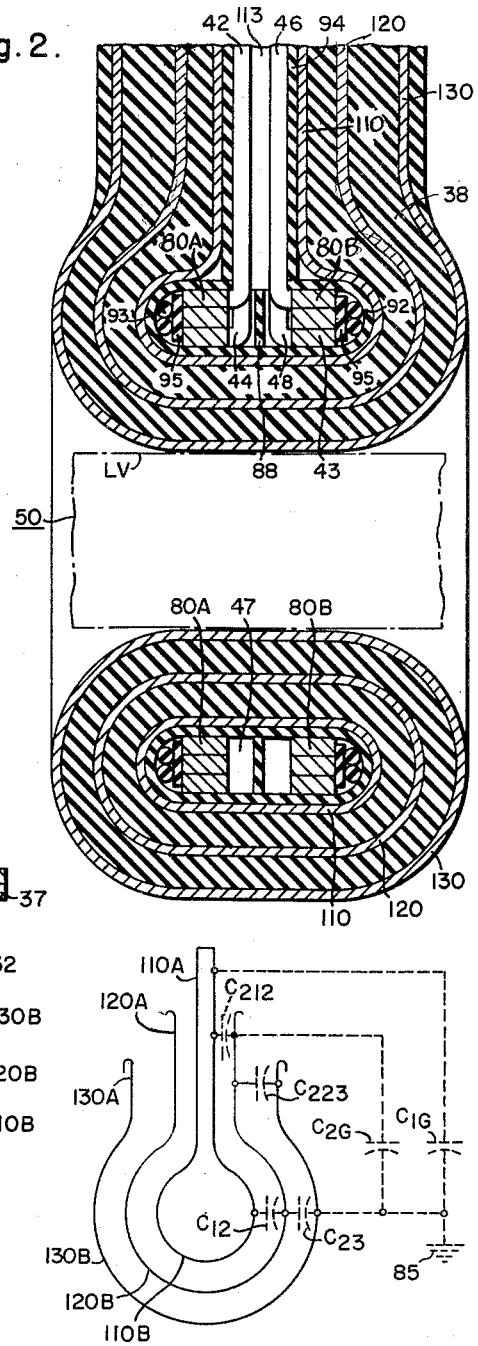
INVENTOR
Unto A. Peuron
BY
Clement L. McHale
ATTORNEY March 9, 1965  U. A. PEURON  3,173,114
ELECTRICAL INDUCTIVE APPARATUS
Filed Jan. 17, 1962  2 Sheets-Sheet 2

3,173,114
ELECTRICAL INDUCTIVE APPARATUS
Unto A. Peuron, Hickory Township, Mercer County, Pa., assignor to Westinghouse Electric Corporation, East Pittsburgh, Pa., a corporation of Pennsylvania
Filed Jan. 17, 1962, Ser. No. 166,787
4 Claims. (Cl. 336—84)

This invention relates to electrical inductive apparatus, such as transformers, and more particularly to winding and insulation structures for such apparatus.

In the construction of certain types of electrical inductive apparatus, such as instrument transformers, solid insulation is often combined in an overall insulation system with a fluid dielectric, such as an insulating oil, which additionally assists in the cooling of the apparatus. The solid insulation may be disposed between the respective windings of the apparatus in a core and coil assembly or between the windings and the grounded portions of the apparatus, such as the casing or magnetic core. As the operating potentials at which transformers of the type described are applied increase, the amount and thickness of the solid insulation required in the space between the high voltage and low voltage windings and around the leads in a conventional construction increase sharply or to a much greater degree than the linear increase in operating potential thus increasing the physical size and weight of a core and coil assembly to an excessive degree. When solid insulation is employed between the windings of a transformer as just described, the maximum potential gradient or dielectric stress present in the space between such windings is an important factor in determining the amount and thickness of the solid insulation required in a particular design or application. When the amount or thickness of solid insulation required at higher operating potentials increases, an additional thermal problem may arise since the solid insulation forms a thermal barrier which hinders or reduces the cooling efficiency of the associated insulating fluid in dissipating or carrying off the heat which results during the operation of a core and coil assembly in a transformer as described due to $I^2R$ losses in the conductors of the windings or due to dielectric losses in the solid insulation. It is therefore desirable to provide an improved winding and insulation construction for transformers of the type described which reduces the maximum potential gradient present in the space between the respective windings of the transformer and the corresponding amount and thickness of the solid insulation required between such windings.

It is an object of this invention to provide a new and improved insulation structure for electrical inductive apparatus, such as transformers.

Another object of this invention is to reduce the maximum potential dielectric gradient to which the insulation of a transformer is subjected when a high operating potential is applied to one of the windings of a transformer.

A further object of this invention is to provide an improved shielding arrangement for the high voltage winding of a transformer.

A more specific object of this invention is to provide a new and improved high voltage instrument transformer, such as a current transformer, in which the amount of insulation required between the respective windings of the transformer is reduced.

Other objects of the invention will, in part, be obvious and will, in part, appear hereinafter.

For a fuller understanding of the nature and objects of the invention, reference should be had to the following detailed description taken in connection with the accompanying drawings, in which:

FIGURE 1 is a front elevational view partly in section of the transformer constructed in accordance with the teachings of the invention;

FIG. 2 is an enlarged side elevational view in partial section of a portion of the transformer illustrated in FIG. 1;

FIG. 5 is a diagrammatic representation of the shielding arrangement employed in the core and coil assembly of the transformer illustrated in FIG. 1.

Figure 4:
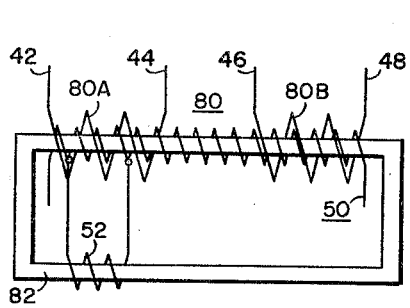
FIG. 4 is a diagrammatic representation of the core and coil assembly of the transformer illustrated in FIG. 1.

Referring now to the drawings and FIGS. 1 and 2 in particular, there is illustrated a high voltage current transformer 20 constructed in accordance with the teachings of the invention. The transformer 20 includes a core and coil assembly which comprises the primary or high voltage winding 80 and the secondary or low voltage winding 50 which are both inductively disposed on a suitable magnetic core structure 82 which may be of any conventional type. The core and coil assembly of the transformer 20 may also include an equalizer coil or winding 52 which is also disposed on the magnetic core 82, as described in greater detail in United States Patent 1,932,051. The high voltage winding 80 includes the first and second winding sections 80A and 80B respectively having the leads 42 and 44 and 46 and 48, respectively, extending upwardly therefrom and electrically connected to the terminals or connectors 84 and 86, respectively, as best shown in FIGS. 1 and 4. The terminals 84 and 86 may be connected in turn to a high voltage alternating current circuit or line whose current is to be measured or sensed. The high and low voltage windings 80 and 50, respectively, are enclosed in a suitable casing or tank 32 while the leads 42 and 44 and 46 and 48 from the first and second high voltage winding sections 80A and 80B, respectively, are enclosed in a suitable hollow cylindrical or tubular bushing or outdoor weather housing 54 whose central opening is tapered in cross-sectional area along its vertical axis as shown in FIG. 1. The casing 32 and the bushing 54 are filled with any suitable fluid dielectric, such as an insulating oil, up to the level indicated at 62. A conventional expansion cap or conservator is mounted or disposed at the top of the bushing 54 in order to allow for the expansion and contraction of the dielectric fluid provided inside the casing 32 and the bushing 54 as the thermal condition of the transformer 20 changes during its operation.

The bushing 54 is supported by and secured to the upper portion of the casing 32 in any suitable manner, such as by a flange member 56 which is rolled on or otherwise secured to the lower end of the bushing 54 and by the flange member 37, which may be formed integrally with the upper portion of the casing 32, as shown in FIG. 1. The flange member 56 may be secured to the flange member 37 by any suitable means, such as bolts or a welded connection, similarly to the construction disclosed in greater detail in U.S. Patent 2,508,184 which is assigned to the same assignee as the present application. It is to be understood that in certain applications a gasket member may be disposed between the flange members 56 and 37 to insure a fluid tight seal.

More specifically, the first and second high voltage winding sections 80A and 80B, respectively, of the high voltage winding 80 are each generally hollow cylindrical or toroidal in configuration and disposed in side-by-side relation with respect to one another or physically parallel to one another on a portion of the magnetic core 82 to form an overall high voltage winding which is generally cylindrical in shape with the high voltage leads 42, 44, 46 and 48 extending generally radially outwardly therefrom through a passageway defined by the central opening of the bushing 54. The low voltage winding 50 is disposed inside the first and second high voltage winding sections 80A and 80B in substantially concentric relationship with both of said high voltage winding sections. Each of the winding sections 80A and 80B of the high voltage winding 80 comprises a plurality of spirally wound turns of the conducting strap material 43 which may be substantially rectangular in cross-section, as illustrated in FIG. 2. The first and second winding sections 80A and 80B of the high voltage winding 80 are spaced apart or displaced from one another to define a space or channel 47 therebetween through which the fluid dielectric whose level is indicated at 62 may flow or travel as will be further explained hereinafter. In order to maintain the spacing between the first and second winding sections 80A and 80B respectively an insulating washer or generally ring-shaped spacing member 88 is disposed between said winding sections and may include a plurality of substantially rectangular spacing members (not shown) which are alternately disposed on the inner and outer periphery of the washer 88 on both sides thereof to permit the flow of the fluid dielectric around said washer between the first and second winding sections 80A and 80B, respectively, of the high voltage winding 80.

Since the first and second winding sections 80A and 80B, respectively, of the high voltage winding 80 are normally connected either in series circuit or parallel circuit relationship with one another to the same high voltage alternating-current circuit or line, the potential difference between the turns of each of said winding sections and between said winding sections is relatively low or negligible. For a series circuit arrangement, the lead 44 of the winding section 80A may be electrically connected to the lead 46 of the winding section 80B through the terminals 84 and 86, while for a parallel circuit arrangement, the leads 42 and 44 of the winding section 80A may be electrically connected to the leads 46 and 48, respectively, of the winding section 80B through the terminals 84 and 86.

It is important to note that since the potential difference between the high voltage winding sections 80A and 80B is very low or negligible, the potential difference or stress across the space or channel 47 between said winding sections is also very low or negligible. On the other hand, the potential difference between the high voltage winding 80 and the low voltage winding 50 or between the high voltage winding 80 and the grounded portions of the transformer 20, such as the casing 32 and the magnetic core 82, is relatively high. In order to insulate the high voltage winding 80 from the low voltage winding 50 and from the grounded portions of the transformer 20, the solid insulation 38 is disposed to substantially surround the high voltage winding 80 and to provide the necessary insulation between the low voltage winding 50 and the high voltage winding 80, as best shown in FIGS. 1 and 2. The solid insulation 38 may be any suitable insulating material, such as crepe paper, in sheet or tape form which is either taped, wrapped or folded around the high voltage winding 80 and between the high voltage winding 80 and the low voltage winding 50.

In order to provide an enlarged duct or channel through which the fluid dielectric may flow vertically either in an upward or downward direction around the leads 42, 44, 46 and 48 of the high voltage winding 80 and for other reasons which will be explained hereinafter, the tubular or hollow cylindrical insulating member 94 which is formed from a suitable insulating material, such as a phenolic laminate, is disposed around said leads between the high voltage winding 80 and the upper portion of said leads inside the bushing 54 as best shown in FIG. 1. The lower end of the insulating member 94 opens into the space or channel 47 between the winding sections 80A and 80B of the high voltage winding 80 to permit the flow of a fluid dielectric between said space or channel and the upper end of the insulating member 94. It is to be noted that the cross-section of the insulating member 94 is preferably substantially circular in configuration for reasons which will be discussed hereinafter.

In order to additionally electrically insulate the leads 42, 44, 46 and 48 of the high voltage winding 80 from the grounded portions of the transformer 20, the solid insulation 138 is disposed to substantially surround at least the major vertical portion of said leads, as best shown in FIG. 1. Similarly to the solid insulation 38 disposed around the high voltage winding 80, the solid insulation 138 may be of a suitable insulating material, such as crepe paper, in flexible sheet form which is either taped, wrapped or folded around the leads 42, 44, 46 and 48. It is to be noted that the thickness of the solid insulation 138 is generally tapered from a maximum value at the lower portion of the leads 42, 44, 46 and 48 to a minimum value near the upper portion of said leads. It is also important to note that the use of the flexible sheet insulation 38 and 138 around the high voltage winding 80 and the leads 42, 44, 46 and 48, respectively, substantially eliminates or reduces the possibility of voids or pockets in the solid insulation surrounding the high voltage winding 80 and its associated leads which would otherwise be filled with a dielectric fluid having a lower specific inductive capacitance than the associated solid insulation. The presence of such voids or pockets in areas or regions of high dielectric stress is particularly undesirable at higher operating potentials and might lead to an insulation failure or breakdown in the solid insulation surrounding the high voltage winding and its leads.

In order to reduce the concentration of dielectric stress in the solid insulation 38 surrounding the high voltage winding 80, particularly adjacent to the outer ends or corners of said high voltage winding, and in the solid insulation 138 surrounding the leads 42, 44, 46 and 48, the inner shielding member 110 having the upper and lower portions 110A and 110B, respectively, is disposed to substantially surround the high voltage winding 80 and at least the major portion of the leads 42, 44, 46 and 48, respectively. The inner shielding member 110 also serves to substantially eliminate any potential stress to which the fluid dielectric might be subjected in the space or channel 47 between the winding sections 80A and 80B of the high voltage winding and in the channel or duct 113 around the leads 42, 44, 46 and 48 inside the tubular insulating member 94 as previously described. The lower portion 110B of the inner shielding member 110 may be formed by tightly or snugly winding a flexible conducting material having a layer of electrically insulating material secured thereto, such as crepe paper backed metallic foil, in the form of a tape substantially around and through the high voltage winding 80 prior to the assembly of the solid insulation 38 around said high voltage winding. The circumferential ends of the lower portion 110B of the inner shielding member 110 are preferably overlapped but with a gap therebetween as indicated at 112 in FIG. 1 which is filled with the solid insulation 38 to prevent a short-circuited turn around the magnetic core 82. In order to prevent short-circuiting the conductor turns of the winding sections 80A and 80B of the high voltage winding 80 and also to increase the effective radius of curvature at the outer corners of said winding sections and thus reduce the concentration of the dielectric stress in the solid insulation 38 adjacent to said corners, the solid insulation 92 is disposed to substantially surround the high voltage winding 80 between said high voltage winding and the lower portion 110B of the inner shielding member 110. The solid insulation 92 may be formed by snugly winding a plurality of layers of flexible sheet insulation around and through the high voltage winding 80 prior to the winding of the lower portion 110B of the inner shielding member 110 thereon. In order to additionally increase the effective radius of curvature of the shielding member 110 at the outer ends or corners of the high voltage winding 80, an insulating washer or ring 95 is disposed at each outer end of the high voltage winding 80 along with one or more insulating rope members as indicated at 93. The insulating washers 95 may be formed from a suitable insulating material, such as pressboard.

Similarly, the upper portion 110A of the inner shielding members 110 may be formed by snugly or tightly winding a flexible conducting material having a layer of insulation secured thereto, such as crepe paper backed metallic foil, in the form of a sheet or tape substantially around the tubular insulating member 94 prior to the assembly of the solid insulation 138 around the leads 42, 44, 46 and 48, as shown in FIGS. 1 and 2. The upper and lower portions 110A and 110B, respectively, of the inner shielding member 110 are electrically connected to one another to form a continuous conducting path throughout the shielding member 110 which will limit the potential difference between the different portions thereof to a negligible value so that there is no interruption in the shielding effect between the upper and lower portions of the shielding member 110. It is to be understood that in certain applications that the shielding member 110 may be formed as a double layer of flexible conducting material which is folded back on itself during the winding thereof to substantially eliminate any inductive effects which might otherwise result from the winding of the shielding member 110.

The upper end of the shielding member 110 is electrically connected to the high voltage terminal 84 by the flexible conducting lead 83 in order that the shielding member 110 provide a substantially equipotential surface around the high voltage winding 80 and the associated leads 42, 44, 46 and 48 which is at substantially the same potential as the high voltage winding 80 to thereby substantially eliminate any potential stress to which any fluid dielectric inside said shielding member is subjected. It is to be noted that the inner shielding member 110 provides a generally cylindrical electrode surface around the high voltage winding 80 and also a generally cylindrical electrode surface around the high voltage leads 42, 44, 46 and 48, the latter electrode surface extending generally radially outwardly from the first mentioned electrode surface through an opening which is located intermediate the ends of the high voltage winding 80.

In order to reduce the concentration of dielectric stress in the solid insulation 138 which surrounds the leads 42, 44, 46 and 48 adjacent to the grounded portions of the casing 32 through which said leads pass through the bushing 54 and to substantially eliminate any potential stress to which the fluid dielectric is subjected inside the casing 32 and in the lower portion of the central opening of the bushing 54, the outer shielding member 130 having the upper and lower portions 130A and 130B, respectively, is disposed to substantially surround the high voltage winding 80 and its associated solid insulation 38 as well as the lower portion of the leads 42, 44, 46 and 48 and the solid insulation 138 which is disposed around said leads. The upper and lower portions 130A and 130B, respectively, of the outer shielding member 130 are formed similarly to the respective portions of the inner shielding member 110 previously described by winding around and through the high voltage winding 80 a flexible conducting material having a layer of insulation secured thereto, such as crepe paper backed metallic foil, after the solid insulation 38 has been assembled around the high voltage winding 80 and by winding the same type of flexible conducting sheet material snugly and tightly around the outer surface of the solid insulation 138 after the latter insulation has been assembled around the leads 42, 44, 46 and 48. The upper portion 130A of the shielding member 130 is embedded in the solid insulation 138 which surrounds the leads 42, 44, 46 and 48 and the upper end of the upper portion 130A is folded back on itself, as indicated at 234, to reduce the concentration of dielectric stress in the adjacent solid insulation and fluid dielectric. Similarly to the shielding member 110, the upper and lower portions 130A and 130B, respectively, of the outer shielding member 130 are electrically connected to form a continuous conducting surface or electrode having a cylindrical configuration around the high voltage winding 80 and a generally hollow cylindrical shape around the lower portion of the leads 42, 44, 46 and 48. The outer shielding member 130 is maintained at zero or ground potential by electrically connecting said shielding member by a flexible conducting lead as indicated at 85 to the casing 32 or to any other grounded portion of the transformer 20, such as the magnetic core 82. As just indicated, the different portions of the outer shielding member 30 are disposed in substantially concentric relation with the corresponding portions of the inner shielding member 110 and similar to the latter shielding member, the different portions of the outer shielding member 130 form a continuous substantially equipotential surface around the outer surface of the solid insulation 38 and the outer surface of the lower portion of the solid insulation 138. It is to be noted that the flexible conducting material from which the outer shielding member 130 is formed permits the shielding member to closely follow the contour or outer surface of the solid insulation 38 and substantially prevents the occurrence of voids or pockets which would otherwise be filled with the associated fluid dielectric and which would be subject to possible insulation failure or breakdown.

In order to reduce the maximum potential gradient in the solid insulation 38 adjacent to the outer corners of the high voltage winding 80, and to provide a more linear voltage distribution along the outer surface of the bushing 54, the intermediate shielding member 120 having the upper and lower portions 120A and 120B, respectively, is disposed to substantially surround the high voltage winding 80 and at least the lower portion of the leads 42, 44, 46 and 48 at a location which is approximately midway in the radial buildup or thickness of the solid insulation 38 and 138, respectively. It is to be noted that the lower portion 120B of the shielding member 120 is embedded in the solid insulation 38 and that the upper portion 120A of the intermediate shielding member 120 is embedded in the solid insulation 138 which surrounds the leads 42, 44, 46 and 48. The upper and lower portions 120A and 120B, respectively, of the intermediate shielding member 120 may be formed similarly to the inner and outer shielding members 110 and 130 respectively, as previously described by winding a flexible conducting material having a layer of insulation secured thereto, such as crepe paper backed metallic foil, in the form of a tape or sheet around and through the high voltage winding 80 after approximately half the solid insulation 38 has been assembled around said high voltage winding and around the lower portion of the leads 42, 44, 46 and 48 after approximately half the solid insulation 138 has been assembled around said leads. The intermediate shielding member 120A includes a gap as indicated at 122 similarly to the gap 112 of the inner shielding member 110 and the gap 132 of the outer shielding member 130 in order to prevent a short-circuited turn around the magnetic core 82 and is formed similarly to the gap 112 as previously described in detail. The upper end of the upper portion 120A of the intermediate shielding member 120 is folded back on itself as indicated at 224 to increase the effective radius of curvature of the upper end of said shielding member and to reduce the concentration of dielectric stress in the adjacent solid insulation 138 and fluid dielectric below the corona level.

The upper and lower portions 120A and 120B, respectively, of the intermediate shielding member 120 are electrically connected with one another or formed from the same flexible conducting material to provide a continuous substantially equipotential surface around the high voltage winding 80 and at least the lower portion of the leads 42, 44, 46 and 48 similarly to the inner shielding member 110 and the outer shielding member 130 as previously described. Similarly, to the latter shielding members, the intermediate shielding member 120 forms a generally cylindrical electrode surface around the high voltage winding 80 and also a generally cylindrical electrode surface around the lower portion of the leads 42, 44, 46 and 48 in substantially concentric or parallel relation with the inner shielding member 110 and the outer shielding member 130. It is important to note that the intermediate shielding member 120 is not directly electrically connected to any source of potential or to ground potential. The potential at the intermediate shielding member 120 is determined by the effective capacitances which exist between the different shielding members 110, 120 and 130 considered as electrode surfaces and between the different shielding members and the grounded portions of the transformer 20.

Figure 6:
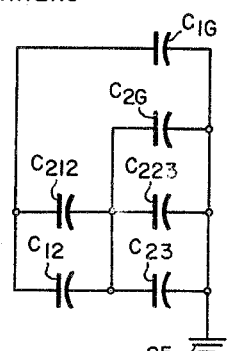
FIG. 6 is an equivalent schematic diagram of the effective capacitive relationships which exist in the shielding arrangement illustrated in FIG. 5.

Referring now to FIG. 5 there is illustrated diagrammatically the shielding members 110, 120 and 130 and the associated effective capacitances which exist between the different portions thereof as well as the effective capacitances which exist between the shielding members 110 and 120 and the grounded portions of the transformer 20. The effective capacitance between the lower portion 110B of the shielding member 110 and the lower portion 120B of the intermediate shielding member 120 is indicated at $C_{12}$. The effective capacitance which exists between the lower portion 120B of the intermediate shielding member 120 and the lower portion of the outer shielding member 130 is indicated at $C_{23}$. The effective capacitance between the upper portion 110A of the inner shielding member 110 and the upper portion 120A of the intermediate shielding member 120 is indicated at $C_{212}$. The effective capacitance between the upper portion 120A of the intermediate shielding member 120 and the upper portion 130A of the outer shielding member 130 is indicated at $C_{223}$. The effective capacitance between the upper portion 110A of the inner shielding member 110 and other grounded portions of the transformer 20, as indicated at 85, is indicated at $C_{2G}$. The effective capacitance which exists between the upper portion 120A of the intermediate shielding member 120 and other grounded portions of the transformer 20 as indicated at 85 is indicated $C_{1G}$. The latter capacitive relationships which exist between the shielding members 110, 120 and 130 and between certain of said shielding members and the grounded portions of the transformer 20 are indicated by the equivalent schematic diagram shown in FIG. 6. It is well known that if a plurality of capacitors are connected in series and a potential applied to the series circuit, then the potential will divide or distribute itself across the respective capacitors inversely in accordance with the capacitance values of said capacitors. It has been found that by providing an intermediate shield having its respective portions disposed at an intermediate radial point in the solid insulation 138 which surrounds the leads 42 through 48 and in the solid insulation 38 which is disposed around the high voltage winding 80 and by varying the effective capacitances between the different portions of the shielding members 110, 120 and 130, the potential at the radial point in the solid insulation 38 at which the intermediate shielding member 120 is disposed can be increased to a value above that which would otherwise exist in the absence of the intermediate shield 120 and the maximum potential gradient which exists at the outer corners of the high voltage winding 80 adjacent to the inner shielding member 110 in the solid insulation can be reduced thereby permitting an important reduction in the amount of thickness of the solid insulation 38 required around the high voltage winding 80 and between the high voltage winding 80 and the low voltage winding 50.

Figure 3:
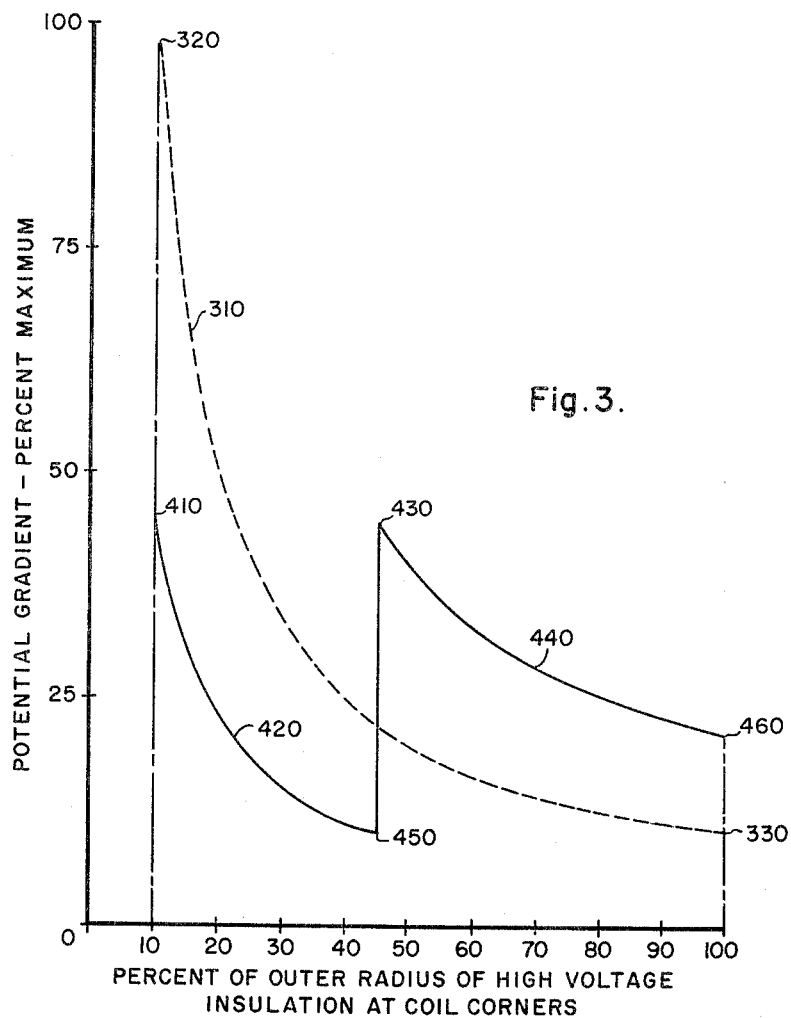
FIG. 3 is a graph illustrating the variation of the potential gradient in certain portions of the insulation in the transformer illustrated in FIG. 1.

Referring now to FIG. 3, the effect of the intermediate shield 120 on the maximum potential gradient in the solid insulation 38 adjacent to the outer corners of the high voltage winding 80 can be better understood by comparing the potential gradient as a percentage of a maximum value plotted as a function of outward radial travel from each outer corner of the high voltage winding 80 both in the absence of the intermediate shield 120 and with the intermediate shield 120 provided in a particular location in the radial buildup of the solid insulation 38. Referring to the curve 310, in the absence of the intermediate shield 120, the potential gradient in the solid insulation 38 would vary from a maximum value adjacent to each outer corner of the high voltage winding 80 at the inner shield 110, as indicated at 320, to a minimum value, as indicated at 330, at the outer shielding member 130, said potential gradient decreasing in an inverse manner as you travel radially outwardly from the inner shield 110 to the grounded outer shield 130 at each outer corner of the high voltage winding 80. It will be seen from an inspection of the curve 310 that the potential gradient at a radial point which is approximately midway in the buildup of the solid insulation 38 at each outer corner of the high voltage winding 80 will be considerably less than half of the maximum potential gradient which is present in the absence of the intermediate shield 120 at the surface of the inner shield 110.

As previously mentioned, if the potential at the intermediate shield 120 can be increased to a value greater than the potential which would exist at the same radial point in the buildup of the solid insulation 38 at each outer corner of the high voltage winding 80, then the potential difference which exists between the inner shield 110 and the intermediate shield 120 is reduced and the maximum potential gradient which exists at each outer corner of the high voltage winding 80 can also be reduced to thereby permit a reduction in the required amount and thickness of the solid insulation 38. The latter increase in potential at the intermediate shield 120 as well as a corresponding reduction in the potential difference which exists between the inner shield 110 and the intermediate shield 120 can be accomplished by increasing the total effective capacitance which exists between the different portions of the inner shield 110 and the different portions of the intermediate shield 120 as indicated at $C_{12}$ and $C_{212}$ in FIGS. 5 and 6. The total capacitance between the inner shield 110 and the intermediate shield 120 can be effectively increased by moving the upper portion 120A of the intermediate shield 120 radially inwardly towards the upper portion 110A of the inner shield 110 around the leads 42 through 48 or by axially extending the length of the intermediate shield 120 in an upward direction around the leads 42 through 48. If it is assumed that the lower portion 120B of the intermediate shielding member 120 is disposed at a radial point which is physically approximately midway in the radial buildup of the solid insulation 38 at each outer corner of the high voltage winding 80, and that the total effective capacitance existing between the inner shield 110 and the intermediate shield 120 is increased in the manner just described, the maximum potential gradient at the surface of the inner shield 110 adjacent to each outer corner of the high voltage winding 80 can be reduced to a value, as indicated at 410 in FIG. 3, which is approximately one half the maximum value that existed in the absence of the intermediate shield 120. The potential gradient will then decrease as you travel radially outwardly at each outer corner of the high voltage winding 80 as indicated by the curve 420 in FIG. 3 to substantially a minimum value as indicated at 450 in FIG. 3 just before you reach the surface of the intermediate shield 120. The potential gradient will then increase sharply to substantially the same maximum value as at the surface of the inner shield 10, as indicated at 430, and then will decrease gradually again as you travel radially outwardly towards the outer grounded shield 130 as indicated by the curve 440 to substantially a second minimum value at the surface of the outer grounded shield 130 as indicated at 460. Since the potential difference between the inner shield 110, which is at the same potential as the high voltage winding 80, and the outer grounded shield 130 is the integral of the potential gradient curves shown in FIG. 3 for a construction which does not include the intermediate shield 120 and for a construction which provides the intermediate shield 120 as disclosed is the same for the curves shown in FIG. 3, the area under the potential gradient curve 310 is the same as the total area under the potential gradient curves 420 and 440 shown in FIG. 3. It will be seen therefore from an inspection of the curves shown in FIG. 3 that the reduction in area between the curve 310 and the curve 420 is substantially equal to the increase in area between the curve 310 and the curve 440.

In summary, the effect of the intermediate shielding member in a winding and insulation structure as disclosed is to reduce the maximum potential gradient that would otherwise exist in the solid insulation 38 surrounding the high voltage winding 80 to substantially one-half the latter maximum value thus permitting a substantial reduction in the amount and thickness of solid insulation required around the high voltage winding 80 and substantially improving the space factor of the transformer 20 since the required size of magnetic core in a particular application is correspondingly reduced as well as the physical weight and size of the overall transformer 20. As mentioned previously, it has also been found that a construction as disclosed including the intermediate shield 20 also results in a more uniform distribution of potential or voltage along the outer axial surface of the bushing 54 thus permitting a reduction in the vertical height of the bushing 54 and in the corresponding size of the transformer 20.

Since the dielectric strength of the solid insulation 38 is substantially constant throughout its radial thickness, the potential gradient which results in the solid insulation 38 in the presence of the intermediate shielding member 120 as indicated by the curves 410 and 420 provides a more uniform stressing of the solid insulation 38 and as just indicated permits a more efficient utilization of the solid insulation compared with the potential gradient which would otherwise exist in the solid insulation 38 in the absence of the intermediate shielding member 120, as indicated by the curve 310 in FIG. 3. In effect, the intermediate shield 120 considerably reduces the maximum potential gradient which would otherwise exist at the surface of the inner shielding member 110 at the outer corners of the high voltage winding 80 and increases the potential gradient in the regions or portions of the solid insulation 38 which are radially removed or displaced from the outer corners of the high voltage winding 80 as shown graphically in FIG. 3. It is important to note that it is possible to reduce the maximum potential gradient in the manner disclosed by moving the upper portion 120A of the intermediate shielding member 120 radially inwardly toward the upper portion 110A of the inner shielding member 110 since the effective radius of curvature of the inner shielding member 110 which is at substantially the same potential as the high voltage winding 80 is much greater than the effective radius of curvature at the outer corners of the high voltage winding 80 at the surface of the lower portion 110B of the inner shielding member 110, although as previously mentioned it is possible to alternatively extend the axial dimension of the upper portion 120A of the intermediate shielding member 120B in an upward direction to obtain the desired increase in total capacitance between the inner shielding member 110 and the outer shielding member 120 in a particular application and to obtain the desired potential relationships between the respective shielding members.

It is to be understood that the intermediate shielding member 120 and the outer shielding member 130 may also be formed from a double layer of flexible conducting material similarly to the inner shielding member 110 as previously described with the flexible conducting material being folded back on itself during the winding of the different shielding members to substantially eliminate any inductive effects which might otherwise result from said shielding members. It is also to be understood that in certain applications that a duct member having an extended creepage path as disclosed in detail in U.S. Patent 2,997,676 which is assigned to the same assignee as the present application may be employed in a particular application to improve the cooling of the core and coil assembly of the transformer 20 and more specifically to dissipate the heat which results from the dielectric losses in the solid insulation 38 and in the solid insulation 138. It is further to be understood that in certain applications additional intermediate shielding members may be employed to improve the potential gradient in certain portions of the solid insulation employed in a transformer of the type disclosed and that the shielding members as disclosed may also be formed from semiconducting or conducting materials of other types, such as semiconducting rubber, flexible insulating material with a metallic coating sprayed thereon or Coronox tape. Finally, it is to be understood that the outer shield 130 may be omitted in certain applications with the metallic casing 32, which is normally at ground potential, functioning as an effective outer shield.

The apparatus embodying the teachings of this invention has several advantages. For example, as previously discussed, the amount and radial thickness of the solid insulation required in a transformer of the type described is considerably reduced to thus reduce the physical size and weight of the transformer. In addition, the reduction in maximum potential gradient means that the possibility of an insulation failure due to the breakdown of the fluid dielectric which is present in overall insulation system of a type disclosed is correspondingly reduced. Finally, the reduction in thickness of the required solid insulation in a transformer of the type described reduces the effect of the solid insulation as a thermal barrier and reduces the requirement for special cooling arrangements, such as ducts or cooling passageways, that might otherwise be necessary. It is to be noted that the high voltage winding sections as well as the solid insulation in a construction as disclosed will benefit from the effect of dielectric fluid flow between said high voltage winding sections and the upper portion of the fluid dielectric inside the bushing 54 by the fluid flowing in opposite directions in different concentric axial paths inside the tubular insulating member 94 and the inner shielding member 110 which is a stress free path from the potential standpoint as previously described. The dielectric fluid provided is also permitted to flow vertically between the interior of the bushing and the outer surface of the solid insulation 138 and the outer surface of the shielding member 130, the latter shielding member providing a potential stress free passageway between the casing 32 and the bushing 54.

Since numerous changes may be made in the above described apparatus and different embodiments of the invention may be made without departing from the spirit and scope thereof, it is intended that all matter contained in the foregoing description or shown in the accompanying drawings shall be interpreted as illustrative and not in a limiting sense.

I claim as my invention:

1. A transformer comprising a metallic casing, a generally cylindrical high voltage winding disposed in said casing, one or more leads electrically connected to said winding and extending outwardly therefrom, solid insulation substantially surrounding said winding and at least a portion of each of said leads, a first shielding member formed of conducting material and disposed between said solid insulation and said winding and between said solid insulation and said leads to substantially surround said winding and leads, and a second shielding member formed from conducting material and having first and second electrically connected portions to substantially surround said winding and said leads, respectively, said second shielding member being disposed intermediate said first shielding member and the outer surface of said solid insulation, the first portion of said second shielding member being positioned substantially midway in the radial buildup of said solid insulation around said high voltage winding, the second portion of said second shielding member being positioned closer to said first shielding member than to the outer surface of said solid insulation to produce a capacitance relationship between said first and second shielding members and between said second shielding member and said metallic casing which forces said second shielding member to assume such a potential that the maximum potential gradient at said first shielding member has substantially the same magnitude as the maximum potential gradient at said second shielding member.

2. A transformer comprising a generally cylindrical high voltage winding having one or more leads extending outwardly therefrom, substantially solid insulation disposed around said winding and said leads, an inner shielding member disposed between said winding and said solid insulation and between said leads and said solid insulation, an outer shielding member disposed adjacent to the outer surface of said solid insulation around said winding and around at least a portion of said leads, and an additional shielding member having first and second electrically connected portions disposed intermediate said inner and outer shielding members adjacent to said winding and leads, respectively, the first portion of said additional shielding member being positioned substantially midway in the radial buildup of said solid insulation around said high voltage winding, the second portion of said additional shielding member being positioned closer to said inner shielding member than to said outer shielding member to produce a capacitance relationship between said inner and additional shielding members and between said additional and outer shielding members which forces said second shielding member to assume such a potential that the maximum potential gradient at said inner shielding member has substantially the same magnitude as the maximum potential gradient at said additional shielding member.

3. An electrical inductive apparatus comprising at least one generally cylindrical winding which is subject to high potentials during operation, said winding including a plurality of conductor turns and one or more leads extending outwardly therefrom, a first shielding member disposed to substantially surround said winding and at least a portion of said leads, said first shielding member being electrically connected to said winding, solid insulation substantially surrounding said winding and said first shielding member, a second shielding member formed from conducting material and disposed to substantially surround at least the major portion of and in close contact with the outer surface of said solid insulation, and an intermediate shielding member embedded in said solid insulation and having first and second portions disposed to substantially surround said winding and at least a portion of said leads, respectively, the first portion of said intermediate shielding member being positioned substantially midway in the radial buildup of said solid insulation around said winding, the second portion of said intermediate shielding member being disposed relatively closer to said first shielding member than to said second shielding member and electrically connected to said first portion to produce a ratio of capacitance between said inner and intermediate shielding members and between said intermediate and outer shielding members which forces said intermediate shielding member to assume such a potential that the maximum potential gradient at said inner shielding member has substantially the same magnitude as the maximum potential gradient at said intermediate shielding member.

4. A transformer comprising a generally cylindrical winding having one or more leads extending radially outwardly therefrom, substantially solid insulation disposed to substantially surround said winding and at least a portion of said leads, a first shielding member disposed between said insulation and said windings and between said solid insulation and said leads to substantially surround said winding and at least a portion of said leads, the maximum potential gradient being adjacent to the ends of said winding when a high operating potential is applied thereto, said first shielding member being formed from conducting material and electrically connected to said winding, a second shielding member formed from conducting material and disposed to surround at least the major portion of the outer surface of said solid insulation in close contact therewith, and a third shielding member formed from conducting material and having first and second electrically connected portions disposed in said solid insulation intermediate said first and second shielding members to substantially surround said winding and at least a portion of said leads, respectively, the first portion of said third shielding member being positioned substantially midway in the radial buildup of said solid insulation around said winding, the second portion of said third shielding member being disposed relatively closer to said first shielding member than to said second shielding member to produce a ratio of capacitance between said first and third shielding members and between said third and second shielding members which forces said third shielding member to assume such a potential that the maximum potential gradient at said first shielding member has substantially the same magnitude as the maximum potential gradient at said third shielding member.

References Cited in the file of this patent

UNITED STATES PATENTS

| | | |
|---|---|---|
| 1,039,298 | Kurda | Sept. 24, 1912 |
| 1,062,046 | Smith | May 20, 1913 |
| 1,129,465 | Fortescue | Feb. 23, 1915 |
| 1,159,226 | Johannesen | Nov. 2, 1915 |
| 1,362,138 | Pratt | Dec. 14, 1920 |
| 1,586,078 | Fischer | May 25, 1926 |
| 2,280,625 | Camilli | Apr. 21, 1942 |
| 2,316,558 | Camilli | Apr. 13, 1943 |
| 2,331,106 | Camilli | Oct. 5, 1943 |
| 2,359,544 | Camilli | Oct. 3, 1944 |
| 2,409,366 | Camilli | June 18, 1946 |
| 2,504,647 | Camilli | Apr. 18, 1950 |
| 2,549,426 | Clark | Apr. 17, 1951 |
| 2,947,958 | Marks | Aug. 2, 1960 |
| 3,028,568 | Camilli | Apr. 13, 1962 |

FOREIGN PATENTS

| | | |
|---|---|---|
| 440,018 | Italy | Oct. 4, 1948 |
| 246,494 | Switzerland | Jan. 15, 1947 |
| 261,665 | Switzerland | Mar. 31, 1949 |
| 269,213 | Switzerland | June 30, 1950 |
| 1,239,860 | France | July 18, 1960 |
| 208,456 | Austria | Apr. 11, 1960 |